(12) United States Patent
Tanemura et al.

(10) Patent No.: US 7,891,285 B2
(45) Date of Patent: Feb. 22, 2011

(54) BEARING RESTRICTING DEVICE IN SWASH PLATE HYDRAULIC PUMP OR MOTOR

(75) Inventors: Hideaki Tanemura, Kanagawa (JP); Takayuki Nakata, Kawasaki (JP)

(73) Assignees: Caterpillar Inc., Peoria, IL (US); Caterpillar Japan Ltd., Tokyo (JP)

( * ) Notice: Subject to any disclaimer, the term of this patent is extended or adjusted under 35 U.S.C. 154(b) by 317 days.

(21) Appl. No.: 11/983,285

(22) Filed: Nov. 8, 2007

(65) Prior Publication Data

US 2009/0120279 A1    May 14, 2009

(51) Int. Cl.
*F01B 3/02* (2006.01)
(52) U.S. Cl. ...................................... 92/12.2
(58) Field of Classification Search ............ 92/12.2
See application file for complete search history.

(56) References Cited

U.S. PATENT DOCUMENTS

| 4,029,367 A | * | 6/1977 | Schwede et al. ............. 92/12.2 |
| 5,383,391 A | | 1/1995 | Goade et al. |
| 5,390,584 A | | 2/1995 | Fritz et al. |
| 5,590,579 A | | 1/1997 | Weber |
| 5,927,176 A | * | 7/1999 | Stolzer ...................... 92/12.2 |

FOREIGN PATENT DOCUMENTS

JP        2004183621        2/2004

* cited by examiner

*Primary Examiner*—F. Daniel Lopez
(74) *Attorney, Agent, or Firm*—Leill & McNeil

(57) ABSTRACT

In a swash plate hydraulic pump or motor structured so that a convex arc surface on the back surface of a swash plate is supported on a concave arc surface of a swash plate support via a bearing in a manner enabling the arc surface to swing in the circumferential direction that follows the arc path. A restricting pin is included for restricting movements of the bearing. The assembly structure prevents the restricting pin from coming out of the swash plate and the swash plate support. One end of the restricting pin is supported rotatably on a side surface of the swash plate. An intermediate portion of the restricting pin is engaged in an engagement hole formed in a holder of the bearing in a loosely fitting manner. Finally, the other end of the restricting pin is inserted into a support rod supported rotatably around its axis on the swash plate support to permit movement of the restricting pin in a pin axial direction.

5 Claims, 9 Drawing Sheets

BEARING RESTRICTING DEVICE IN SWASH PLATE HYDRAULIC PUMP OR MOTOR

TECHNICAL FIELD

The present disclosure relates generally to swash plate type hydraulic pumps or motors, and more particularly, to a device for restricting movements of a swash plate support bearing.

BACKGROUND

Generally, a swash plate hydraulic pump or motor is structured so that a reciprocating stroke of a piston is increased or decreased by changing an inclination angle of a swash plate, and thereby, the capacity of the pump or motor is variable. A swash plate hydraulic pump or motor may include a convex arc surface formed on the back surface of the swash plate, and a concave arc surface on a swash plate support which faces the convex arc surface of the swash plate. A bearing is interposed between the convex arc surface and the concave arc surface. The swash plate is supported to freely swing in the circumferential direction along the arc shape. In this structure, the bearing interposed between the convex arc surface and the concave arc surface may move with the swing of the arc surface of the swash plate and be gradually displaced or fall out; therefore, a restricting device for restricting movements of the bearing may become necessary. One conventionally known restricting device is described in U.S. Pat. No. 5,590,579. This patent discloses a link member rotatably supported on the swash plate support at the one end, engaged with a holder of the bearing at the intermediate portion, and engaged with a U groove formed on the swash plate at the other end. Another technique, shown in Japanese Published Unexamined Patent Application No. 2004-183621, discloses a holder rod fitted in a fitting hole formed in the swash plate at the one end, loosely fitted in a slit formed in the holder of the bearing at the intermediate portion and loosely fitting with a pin implanted in a case side at the other end.

However, according to the technique described in U.S. Pat. No. 5,590,579, the other end of the link member may come out of the U groove if the swing angle of the swash plate is increased because the other end of the link member is only engaged in the U groove formed on the swash plate, which will cause undesired limitation of the swing angle of the swash plate. According to the technique described in Japanese Published Unexamined Patent Application No. 2004-183621, the other end of the holder rod is loosely fitted with a pin implanted in the case side; however, one end and the intermediate portion of the holder rod is not restricted from coming out of the fitting hole of the swash plate and the slit of the bearing holder, so it is necessary to restrict the pin from coming out of the holder rod at the other end. The pin that loosely fits with the other end of the holder rod is implanted in a restricting member on the case side so as to restrict the pin from coming out of the holder rod, and the restricting member is installed by way of an opening on the outside of the case. As a result, it becomes necessary to provide a sealing member for sealing this opening on the case side, which will cause an increased number of parts and drive up the costs. Furthermore, in this construction, when installing the restricting member into the case, it must be installed with the position adjusted so that the pin implanted in the restricting member does not come out of the other end of the holder rod. This is necessary so that the restricting member does not disturb the movements of the holder rod. This is troublesome and poor in workability.

The present disclosure is directed to one or more of the problems set forth above.

SUMMARY OF THE DISCLOSURE

A bearing restricting device and a swash plate hydraulic pump or motor includes a swash plate having a convex arc surface formed on a back surface. A swash plate support includes a concave arc surface facing the convex arc surface of the swash plate. The convex arc surface of the swash plate is supported on the concave arc surface of the swash plate support so as to freely swing in a circumferential direction by interposing a bearing between the convex arc surface and the concave arc surface. A restricting pin is included for restricting movement of the bearing. The restricting pin is rotatably supported on a swash plate side surface at a one end, engages with an engagement portion formed on a holder of the bearing in a loosely fitted manner in an intermediate portion, and is inserted in a support rod supported rotatably around an axis on the swash plate support at an other end. The restricting pin remains moveable in a pin axial direction of the restricting pin.

In another aspect, a swash plate hydraulic pump or motor includes a housing with a concave arc surface. A shaft is rotatably supported by the housing. A swash plate with a convex arc surface faces the concave arc surface. The support rod is rotatably mounted in a bore disposed in the housing. A bearing is positioned between the convex arc surface and the concave arc surface. The restricting pin has one end rotatably received in a bore of the swash plate, and intermediate portions slideably received through a bore of the bearing, and an opposite end slideably received in a bore through the support rod.

In another aspect, a method of operating a swash plate hydraulic pump or motor include displacing hydraulic fluid by reciprocating pistons by rotating a shaft. Displacement of the pistons is adjusted by varying an angle of a swash plate relative to a housing. A bearing is kept between a convex arc surface of the swash plate in a concave arc surface of the housing by locking the bearing to an intermediate portion of a restricting pin. One end of the restricting pin is rotationally supported in a bore of the swash plate. An opposite end of the restricting pin is slideably received through a bore of a support rod rotatably mounted in the housing.

DETAILED DESCRIPTION

Figure 1:
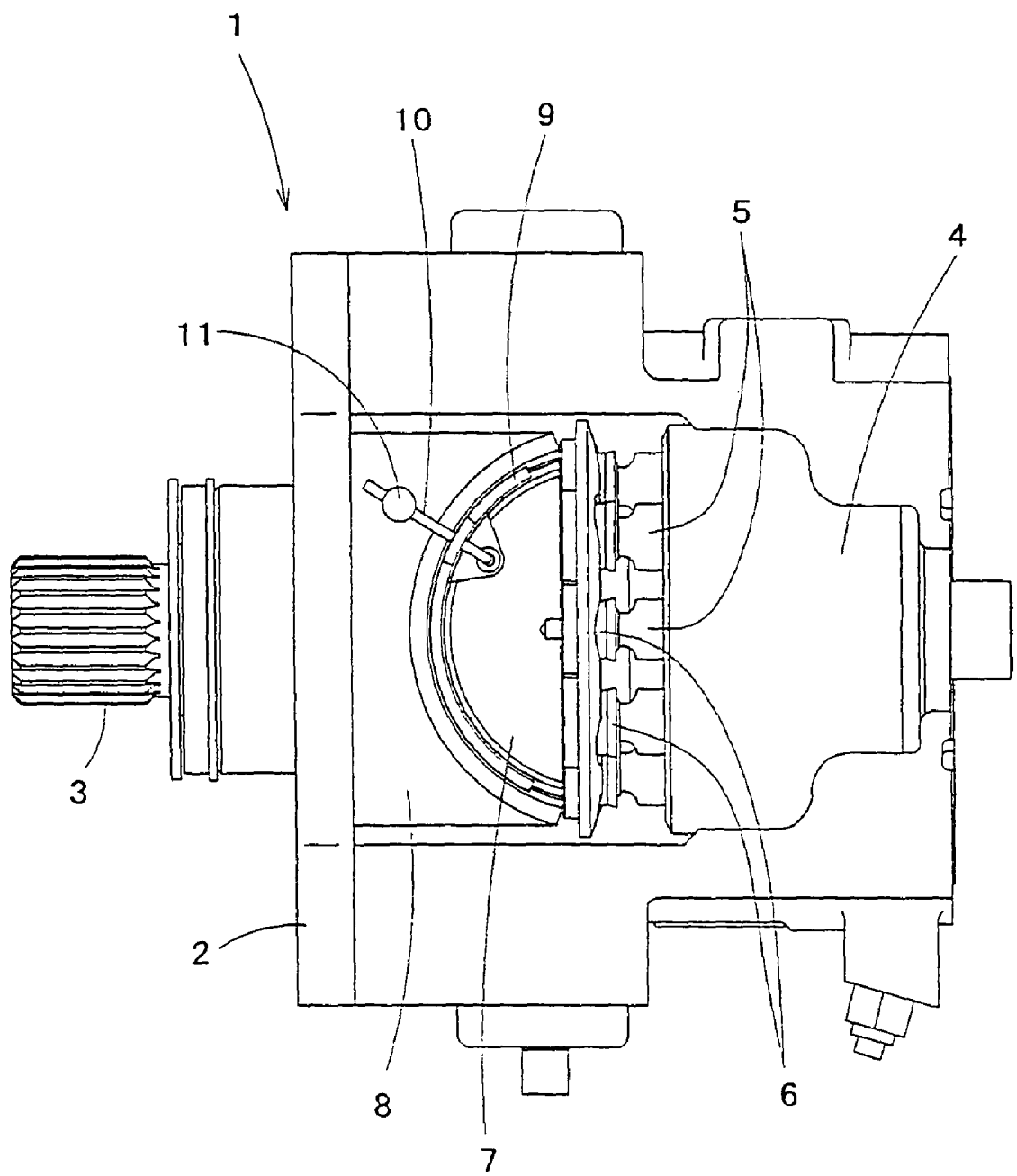
FIG. 1 is a partly cut-away entire view of a swash plate hydraulic pump.
Figure 2:
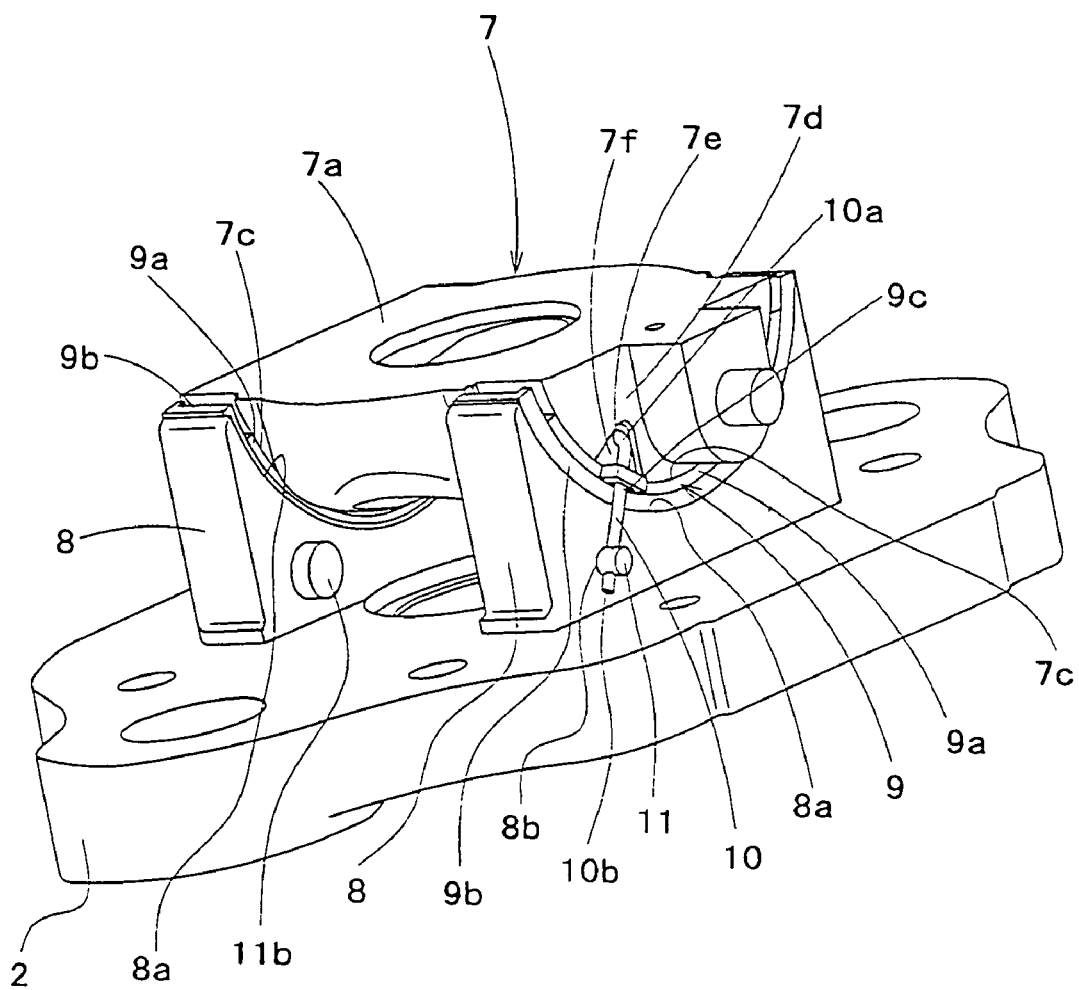
FIG. 2 is a main portion perspective view in the first embodiment.
Figure 3:
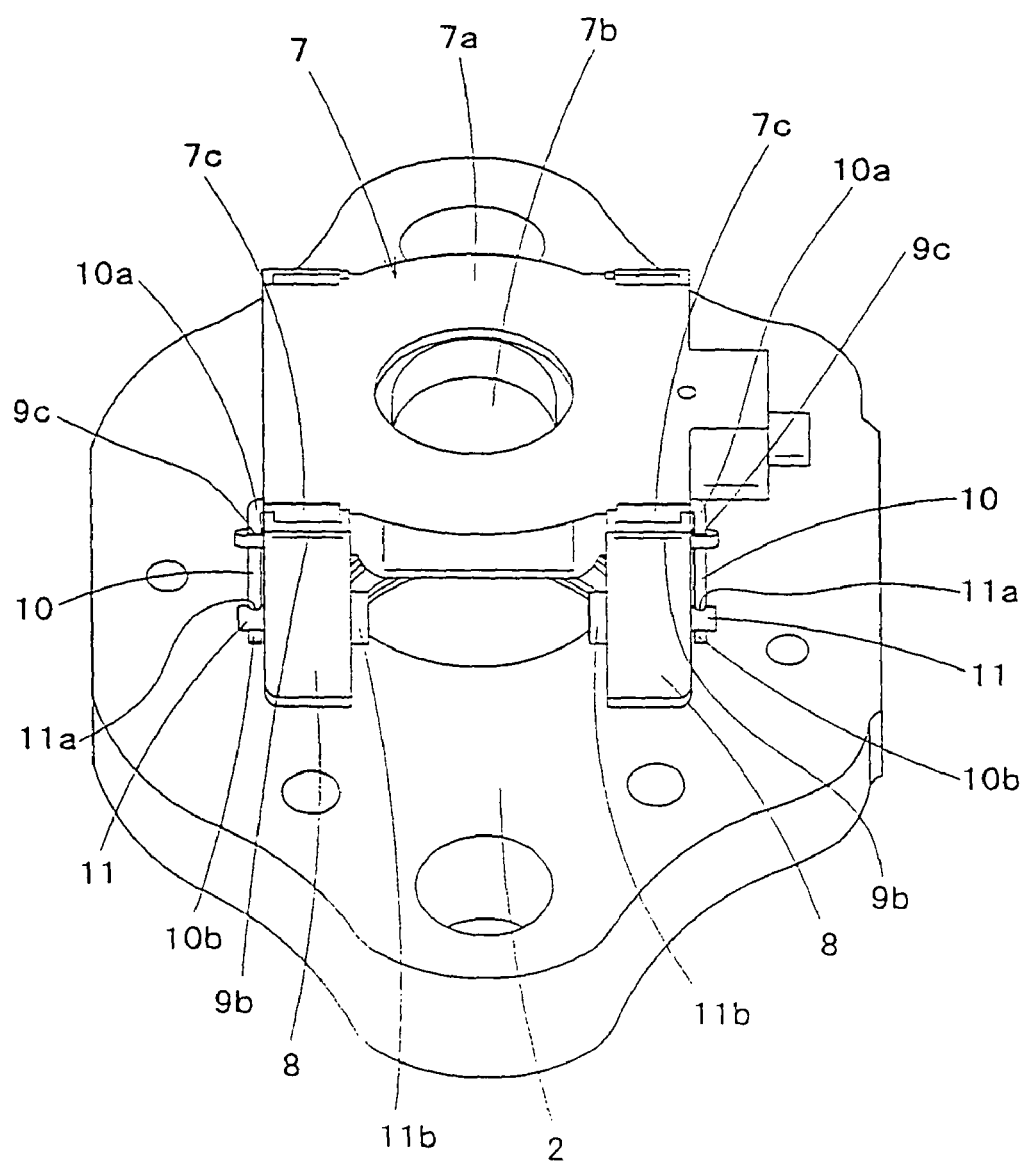
FIG. 3 is a main portion front view in the first embodiment.
Figure 4:
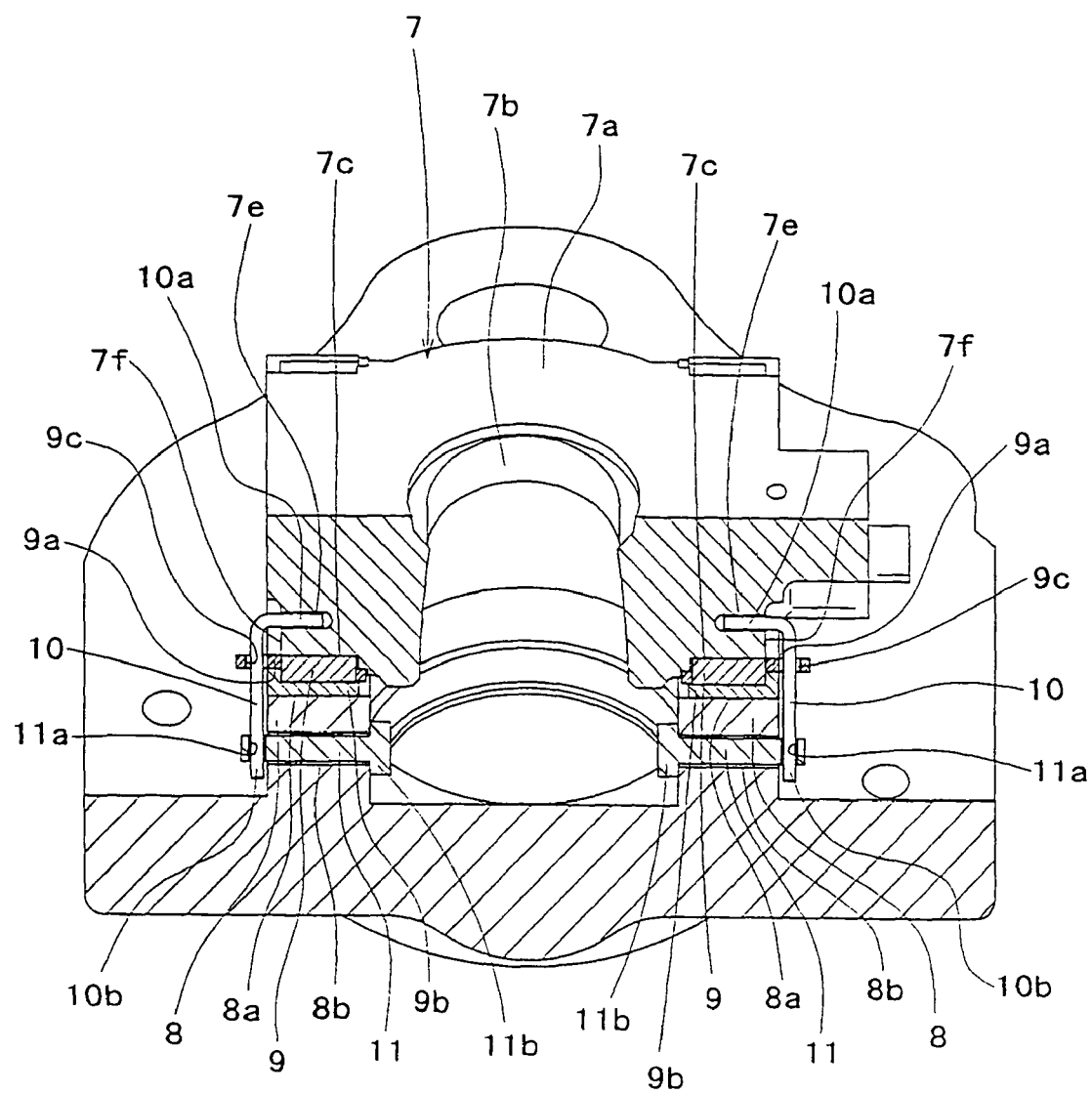
FIG. 4 is a main portion sectional view in the first embodiment.
Figure 5:
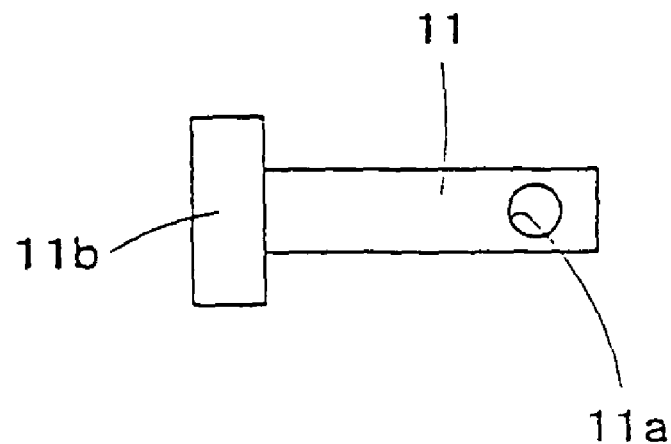
FIG. 5(A) is a front view and FIG. 5(B) is a side view of the support rod in the first embodiment.
Figure 5:
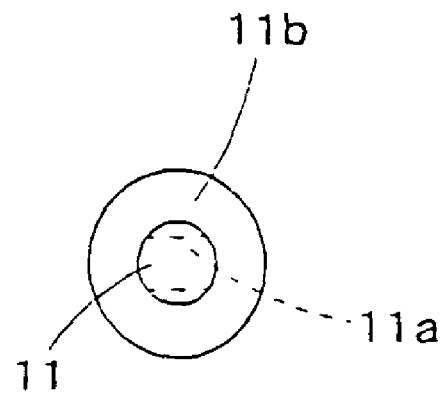

A first embodiment of the present disclosure will be described with reference to FIGS. 1 through 5. In these drawings, the reference numeral 1 denotes a swash plate hydraulic pump. The swash plate hydraulic pump 1 includes a drive shaft 3 axially supported on the housing 2 in a rotatable manner. A cylinder block 4 rotates integrally with the drive shaft 3. A plurality of pistons 5 are installed in the cylinder block 4 so as to move reciprocately, and shoes 6 are fitted to the tip ends of the pistons 5. A swash plate 7 has a cam surface 7a on which the shoes 6 slideably contact. Due to a variation in inclination angle of the swash plate 7 relative to an axis of the drive shaft 3 based on the operation of a regulator that is not shown, the reciprocating stroke length and hence displacement of the pistons 5 varies. By varying the swash plate angle, the discharge flow rate of the swash plate hydraulically pump 1 is increased or decreased.

The drive shaft 3 is inserted through a shaft through hole 7b that is formed at the center of the swash plate 7. On the back surface side of the cam surface 7a, which the shoes 6 slideably contact, a pair of convex arc surfaces are formed adjacent to, and on opposite sides of, the shaft through hole 7b. In addition, the housing 2 includes a pair of swash plate supports 8 that are integrally formed on the housing 2. The swash plate supports 8 include concave arc surfaces 8a that respectively face the pair of convex arc surfaces 7c of the swash plate 7.

Furthermore, between the convex arc surfaces 7c of the swash plate 7 and the concave arc surfaces 8a of the swash plate support 8, a roller type bearing 9 attached with a holder 9a is interposed. Via the bearing 9, the convex arc surfaces 7c of the swash plate 7 are supported on the concave arc surface 8a of the swash plate support 8 so as to freely swing in the circumferential direction that follows the arc path. The reference numeral 9b denotes an outer race to be fixed onto the concave arc surface 8a of the swash plate support 8.

The reference numeral 10 denotes a restricting pin for restricting movement of the bearing 9. One end 10a of the restricting pin 10 may be bent at a right angle with respect to the pin axial direction. The one end 10a of the restricting pin 10 is rotatably inserted in a pin hole or a bore 7e formed in a side surface 7d of the swash plate 7, and thereby, the restricting pin 10 is supported on the side surface 7d of the swash plate 7 rotatably around the one end 10a as a fulcrum. A concave portion 7f is formed on the swash plate side surface 7d where the pin hole 7e is formed so as to prevent the swash plate side surface 7d from interfering with the swing of the restricting pin 10. The intermediate portion of the restricting pin 10 is engaged in an engagement hole or a bore of the bearing 9c (corresponding to the engagement portion of the present disclosure) formed in the outer circumference of the holder 9a of the bearing 9 in a loosely fitting manner.

A through hole 8b facing in a direction orthogonal to the pin axial direction of the restricting pin 10 is bored in the swash plate support 8. In the through hole 8b, a support rod 11 is inserted rotatably around the axis of the through hole 8b. One end of the support rod 11 projects from one side surface of the swash plate support 8, and the other end 10b of the restricting pin 10 is inserted in an insertion hole 11a bored in the projecting end portion of the support rod 11, allowing movement of the restricting pin 10 in the pin axial direction. On the other end of the support rod 11, a locking portion 11b having a diameter larger than that of the through hole 8b of the swash plate support 8 is formed adjacent to the other side surface of the swash plate support 8 so as to prevent the support rod 11 from coming out of the through hole 8b.

In the first embodiment constructed as described above, a convex arc surface 7c is formed on the back surface of the swash plate 7. The swash plate support 8 is integrally formed in the housing 2. A concave arc surface 8a faces the convex arc surface 7c of the swash plate 7. The bearing 9 is interposed between the convex arc surface 7c and the concave arc surface 8a. The convex arc surface 7c of the swash plate 7 is supported on the concave arc surface 8a of the swash plate support 8 in a manner enabling the arc surface 7c to swing in the circumferential direction defined by the arc shape. In this structure, the restricting pin 10 is provided for restricting the movements of the bearing 9, and is rotatably supported in the pin hole 7e of the swash plate side surface 7 at the one end 10a. The intermediate portion of the pin 10 is engaged in the engagement hole 9c on the outer circumference of the holder 9a of the bearing 9 in a loosely fitting manner. The pin 10 is inserted movably in the pin axial direction through the support rod 11 supported on the swash plate support 8, and movable around the axis at the other end 10b.

Therefore, when the convex arc surface 7c of the swash plate 7 swings in the circumferential direction with respect to the concave arc surface 8a of the swash plate support 8, one end 10a of the restricting pin 10 rotates with respect to the swash plate 7 and the swash plate support 8, and the other end 10b moves in the pin axial direction with respect to the swash plate support 8 and support rod 11. If the swing angel of the swash plate 7 increases, the restricting pin 10 can swing following the swing of the swash plate 7 without coming out of the swash plate 7 and the swash plate support 8, and can restrict the movements of the bearing 9 engaged with the intermediate portion of the restricting pin 10 so as to prevent the bearing 9 from being displaced or falling-out. Furthermore, a separate member is not needed to prevent the restricting pin 10 from coming out of the swash plate 7 and the swash plate support 8, and this fact reduces the number of parts and contributes to a reduction in cost.

Additionally, the support rod 11 is inserted through the through hole 8b bored in the swash plate support 8 and is rotatable around its axis in a direction orthogonal to the pin axial direction of the restricting pin 10. One end of the support rod 11 projects from one side surface of the swash plate support 8. The other end 10b of the restricting pin 10 is slideably inserted into the projecting end portion of rod 11 in a manner that permits pin 10 to move in the pin axial direction. On the other hand, the locking portion 11b formed on the other end of the support rod 11 prevents the support rod 11 from coming out of the through hole 8b. Thereby, by only inserting the support rod 11 through the through hole 8b of the swash plate support 8 and inserting the other end 10b of the restricting pin 10 into the projecting end portion of the support rod 11, it becomes possible to support the other end of the restricting pin 10 on the swash plate support 8 so as not to come out while retaining rotatability and movability in the pin axial direction. Assembly of the support rod 11 with the swash plate support 8 and the restricting pin 10 with the support rod 11 can be easily performed.

Figure 6:
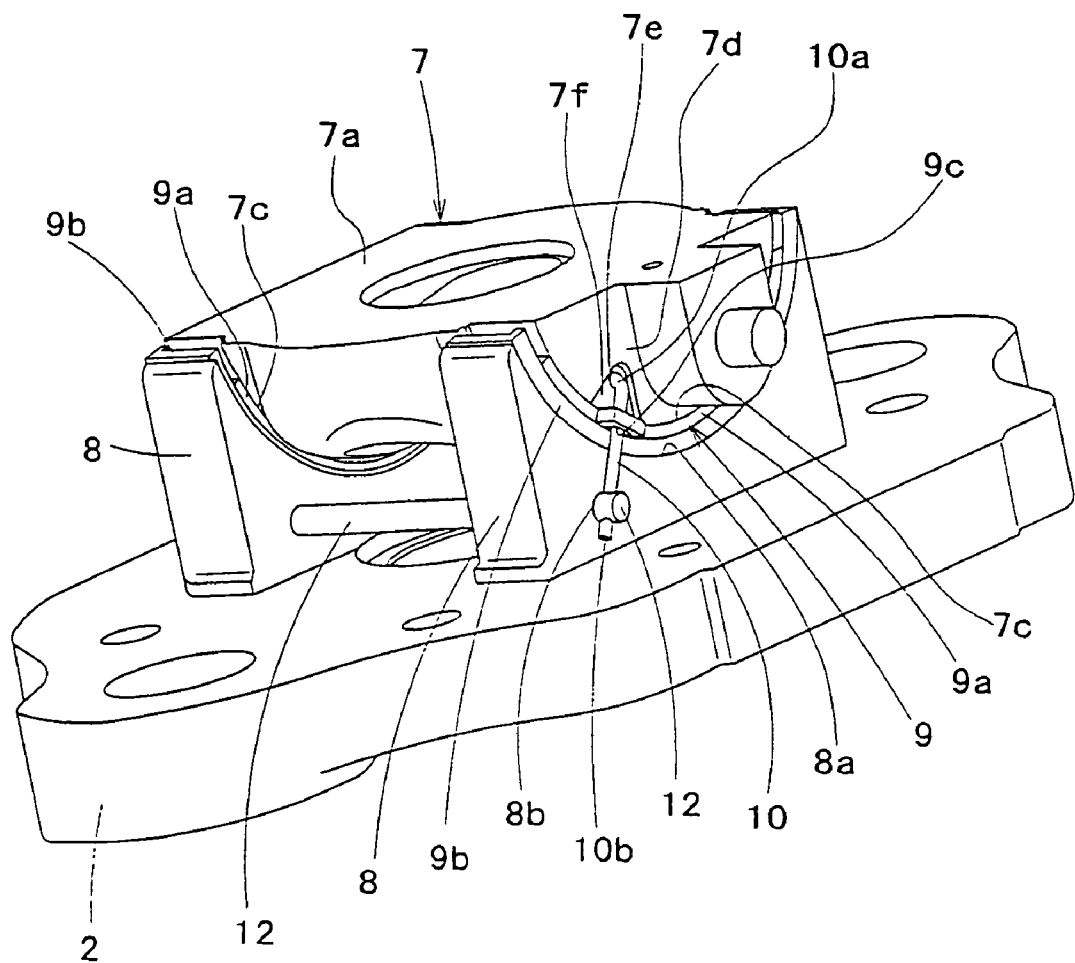
FIG. 6 is a main portion perspective view in the second embodiment.
Figure 7:
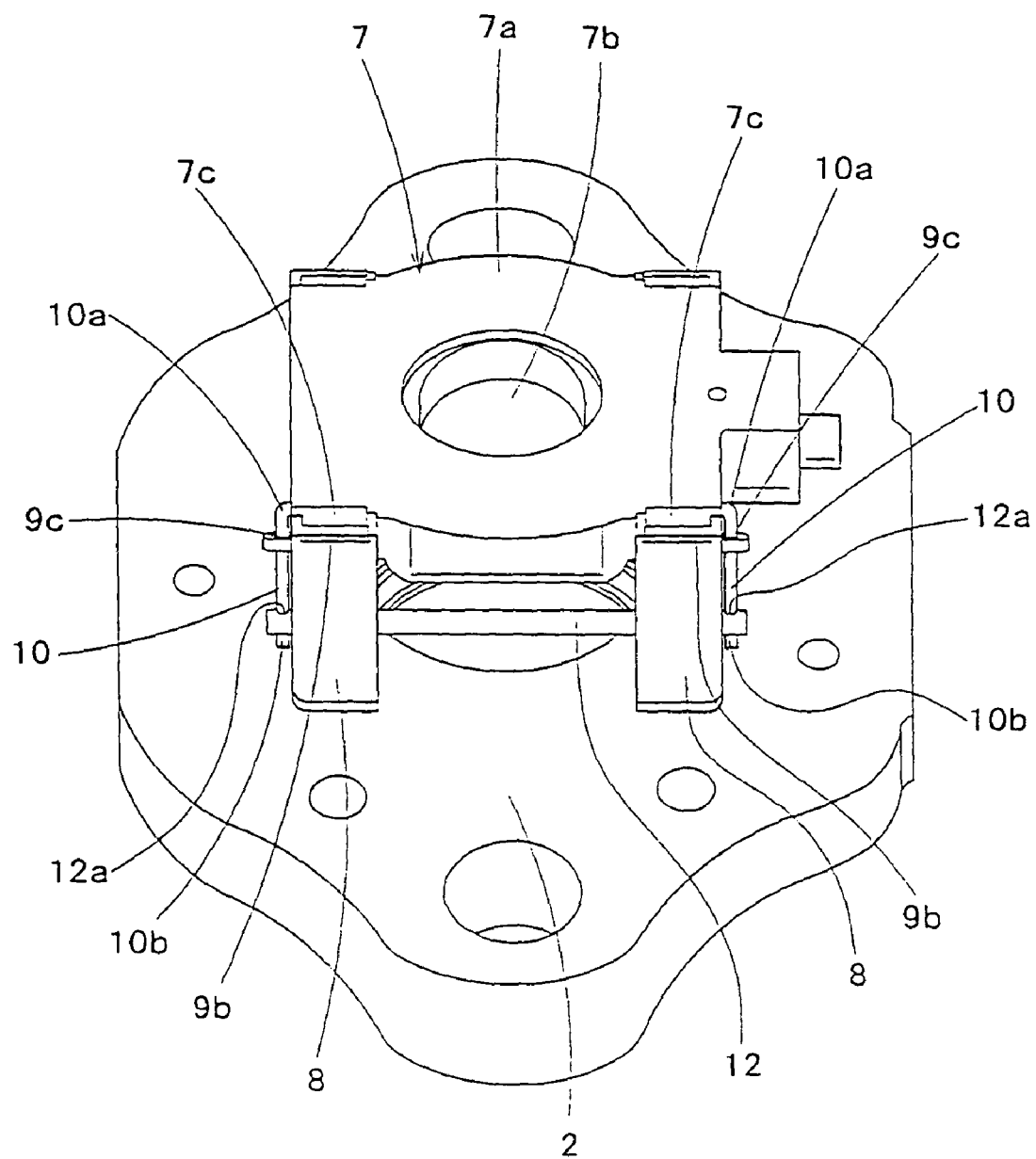
FIG. 7 is a main portion front view in the second embodiment.
Figure 8:
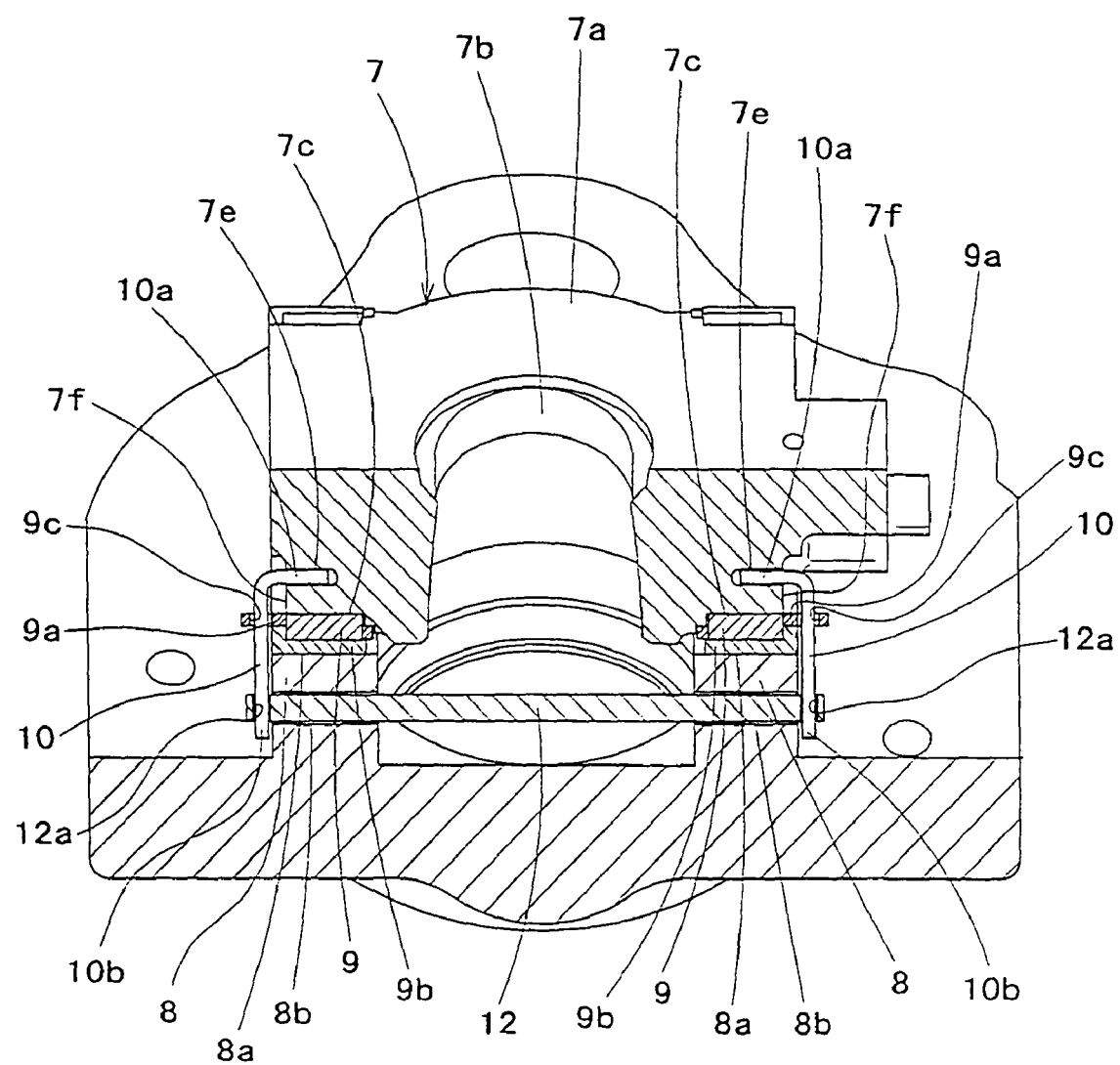
FIG. 8 is a main portion sectional view in the second embodiment.
Figure 9:
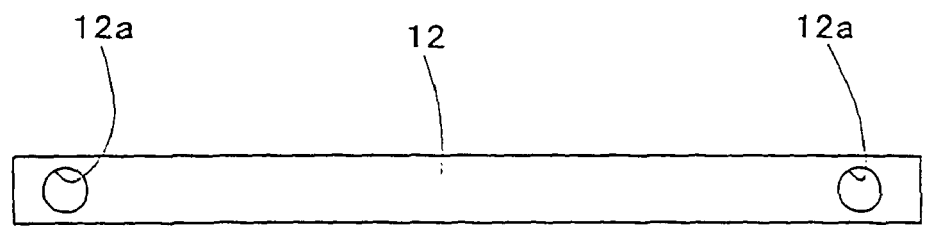
FIG. 9(A) is a front view and FIG. 9(B) is a side view of the support rod in the second embodiment.
Figure 9:
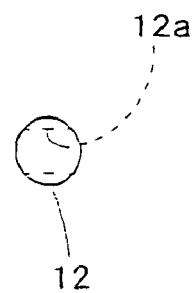

A second embodiment of the present disclosure will be described with reference to FIGS. 6 through 9. In the second embodiment, components other than the support rod 12 are the same as in the first embodiment, so they are attached with the same reference numerals and a description thereof is omitted. Concerning FIG. 1, the components of the first embodiment are commonly used in the second embodiment. In the first embodiment, pairs of components correspond to the pair of convex arc surfaces 7c formed on the back surface of the swash plate 7. The swash plate support 8, bearing 9, restricting pin 10, and support rod 11 are provided in pairs. In the second embodiment, the swash plate support 8, the bearing 9, and the restricting pin 10 are similarly provided in pairs; however, the necessary number of support rods 12 is only one.

In the second embodiment, a pair of through holes 8b facing in a direction orthogonal to the pin axial direction of the restricting pins 10 are bored coaxially in the pair of swash plate supports 8. One support rod 12 is inserted across the pair of through holes 8b rotatably around its axis. Then, both ends of the support rod 12 project from side surfaces of the pair of swash plate supports 8. The other ends 10b of the pair of restricting pins are inserted in the pair of through holes 12a bored in both projecting end portions to slideably support the pin 10 in the pin axial direction.

In addition, the same action and effect as in the first embodiment described above are obtained in the second embodiment. Furthermore, because in the second embodiment only one support rod 12 is needed for supporting the other ends 10b of the pair of restricting pins 10, the supporting rod 12 is prevented from coming out in both directions by the pair of restricting pins 10 inserted in both projecting end portions. It is not necessary to form the locking portion 11b to prevent the support rod 12 from coming out. Thus, rod 12 can be of a uniform diameter. Therefore, the second embodiment structure contributes to a reduction in the number of parts and simplification in the structures of the parts. In this alternative, the pair of restricting pins 10 synchronously move, so that the pair of bearings 9 also synchronously swing, and therefore, the swing of the swash plate 7 supported by the pair of bearings 9 can be smoothly controlled. Those skilled in the art will appreciate that the length of pin 10 should be such that it can accommodate the full range of movement of swash plate 7 without coming out of the bore of the through support rod 11 or 12.

Also disclosed is a method of operating a swash plate hydraulic pump or motor. The steps include displacing hydraulic fluid by reciprocating pistons 5 by rotating a shaft 3, and adjusting a displacement of the pistons 5 by varying an angle of a swash plate 7 relative to a housing 2. Bearing 9 is kept between a convex arc surface 7c of the swash plate 7 and a concave arc surface 8a of the housing 2 by locking the bearing 9 to an intermediate portion of a restricting pin 10. One end of the restricting pin 10 is rotationally supported in a bore of the swash plate 7. An opposite end of the restricting pin 10 is slideably received in through a bore of a support rod 11 rotatably mounted in the housing 2. The method of operating a swash plate hydraulic pump or motor may include a step of synchronizing movement of a pair of bearings 9 by linking a pair of restricting pins 10 to a common support rod 11, and may also include a step of sliding the restricting pin 10 through the bore of the support rod 11 in response to an angle adjustment of the swash plate 7.

Furthermore, as a matter of course, the present disclosure is applicable not only to the swash plate hydraulic pump as in the case of the first and second embodiments but also to a swash plate hydraulic motor. In the case of a swash plate hydraulic motor, an output shaft is inserted through the shaft through hole 7b of the swash plate 7. In addition, the present disclosure is also applicable to devices that operate at different times as a pump and a motor, or a device pump or motor that can facilitate fluid flow in both directions. In such cases, the swash plate may assume positive and negative angles, possibly justifying additional bearings, support rod(s) and restricting pins according to the present disclosure.

INDUSTRIAL APPLICABILITY

The present disclosure finds potential application to any swash plate type hydraulic pump or motor. The present disclosure finds particular application to swash plate type hydraulic pumps and motors in which the swash plate includes a convex arc surface supported via a bearing on a convex arc surface for adjusting the angle of the swash plate. Finally, the present disclosure finds specific application to allowing a full range of angular variation in the swash plate while preventing the bearing from escaping from the interface between the convex arc surface of the swash plate and the concave arc surface of the swash plate support.

Referring again to the Figures, the hydraulic pump 1 is operated by rotating the drive shaft 3 which causes the cylinder block 4 to rotate with respect to the housing 2. The flow rate through the hydraulic pump 1 is adjusted via an actuator (not shown) to adjust the angle of the swash plate 7 relative to the swash plate support 8, which is fixed in the housing 2. The angle of the swash plate 7 determines the stroke distance of the pistons 5 and hence how much fluid is displaced through the pump with each rotation of the drive shaft 3. The adjustment of the swash plate angle is facilitated by the bearing 9 that is located in the interface between convex arc surface 7c and the convex arc surface 8 of the swash plate support in the housing 2. The bearing 9 is prevented from escaping from the interface via the restricting pin 10 that has one end received in the hole 7e of the swash plate 7 and another end that is received in the bore through the support rod 11 or 12. The restricting pin 10 is sufficiently long that it can slide in and out of the bore and the support rod 11 or 12 without the one disconnecting from the other through the full range of angular orientations of the swash plate 7 with regard to the support 8. An intermediate segment of restricting pin 10 protrudes through the engagement hole of the holder 9a for the bearing 9. Thus, both ends of retention pin 10 are trapped and can not escape. Hence, the bearing 9 is always connected to the retention pin 10 and can not escape from between the convex arc surface 7c and the concave arc surface 8 of the support portion of the housing 2. The restricting pin 10 limits extreme movements of the bearing 9 while facilitating a full angular range of positioning of the swash plate 7.

It should be understood that the above description is intended for illustrative purposes only, and is not intended to limit the scope of the present invention in any way. Thus, those skilled in the art will appreciate that other aspects of the invention can be obtained from a study of the drawings, the disclosure and the appended claims.

What is claimed is:

1. A bearing restricting device in a swash plate hydraulic pump or motor, the swash plate hydraulic pump or motor comprising:

a swash plate having a convex arc surface formed on a back surface;

a swash plate support on which a concave arc surface facing the convex arc surface of the swash plate is formed, the convex arc surface of the swash plate being supported on the concave arc surface of the swash plate support so as to freely swing in a circumferential direction by interposing a bearing between the convex arc surface and concave arc surface;

a restricting pin for restricting movements of the bearing;

wherein the restricting pin is rotatably supported on a swash plate side surface at a one end, and engages with an engagement portion formed on a holder of the bearing in a loosely fitting manner at an intermediate portion, and is inserted in a support rod supported rotatably around an axis on the swash plate support at an other end so as to be movable in a pin axial direction of the restricting pin; and wherein the convex arc surface is provided in pairs each formed on the back surface of the swash plate on both sides of a shaft through hole which a drive shaft or output shaft is inserted through, and the swash plate supports, the bearing, the restricting pin and the support rod are provided in pairs each corresponding to the pair of convex arc surfaces, respectively and wherein each support rod penetrates each swash plate support in a direction orthogonal to the pin axial direction of the restricting pin rotatably around the axis, one end of the support rod projecting from one side surface of the swash plate support, the other end of the restricting pin being inserted into the projecting end portion movably in the pin axial direction, and the other end of the support rod being engaged with the other side surface of the swash plate support so as not to come out.

2. A bearing restricting device in a swash plate hydraulic pump or motor, the swash plate hydraulic pump or motor comprising:

a swash plate having a convex arc surface formed on a back surface;

a swash plate support on which a concave arc surface facing the convex arc surface of the swash plate is formed, the convex arc surface of the swash plate being supported on the concave arc surface of the swash plate support so as to freely swing in a circumferential direction by interposing a bearing between the convex arc surface and concave arc surface;

a restricting pin for restricting movements of the bearing;

wherein the restricting pin is rotatably supported on a swash plate side surface at a one end, and engages with an engagement portion formed on a holder of the bearing in a loosely fitting manner at an intermediate portion, and is inserted in a support rod supported rotatably around an axis on the swash plate support at an other end so as to be movable in a pin axial direction of the restricting pin; and wherein the convex arc surface is provided in pairs each formed on the back surface of the swash plate on both sides of a shaft through a shaft through hole which a drive shaft or an output shaft is inserted through, and the swash plate support, the bearing, and the restricting pin is provided in pairs each corresponding to the pair of convex arc surfaces, respectively, and wherein the support rod penetrates the pair of swash plate supports in a direction orthogonal to the pin axial direction of the restricting pins rotatably around the axis, both ends of the support rod projecting from side surfaces of the respective swash plate supports, and the other ends of the pair of restricting pins being inserted into the both projecting end portions movably in the pin axial direction.

3. A swash plate hydraulic pump or motor comprising:

a housing that includes concave arc surface;

a shaft rotatably supported by the housing;

a swash plate with a convex arc surface facing the concave arc surface;

a support rod rotatably mounted in a bore disposed in the housing;

a bearing positioned between the convex arc surface and the concave arc surface; and a restricting pin with one end rotatably received in a bore of the swash plate, an intermediate portion slideably received through a bore of the bearing, and an opposite end slideably received in a bore through the support rod;

wherein the restricting pin includes a right angle bend between the one end and the bore through the bearing; and wherein the support rod is received through a pair of coaxial bores in the housing;

the restricting pin is a first restricting pin slideable in a first bore of the support rod; and a second restricting pin slideable in a second bore of the support rod.

4. A method of operating a swash plate hydraulic ump or motor, comprising the steps of:

displacing hydraulic fluid by reciprocating pistons by rotating a shaft;

adjusting a displacement of the pistons by varying an angle of a swash plate relative to a housing;

keeping a bearing between a convex arc surface of the swash plate and a concave arc surface of the housing by locking the bearing to an intermediate portion of a restricting pin;

the keeping step including a step of rotationally supporting one end of the restricting pin in a bore of the swash plate;

the keeping step including slideably receiving an opposite end of the restricting pin through a bore of a support rod rotatably mounted in the housing;

wherein the bearing is one of a pair of bearings, the restricting pin is one of a pair of restricting pins, and the support rod is a common support rod; and synchronizing movement of the pair of bearings by linking the pair of restricting pins to the common support rod.

5. The method of claim 4 including a step of sliding the restricting pin through the bore of the support rod in response to an angle adjustment of the swash plate.

* * * * *